Aug. 11, 1959 N. H. SHEPHERD 2,899,639
FREQUENCY DETECTION METHOD AND APPARATUS THEREFOR
Filed Sept. 24, 1954
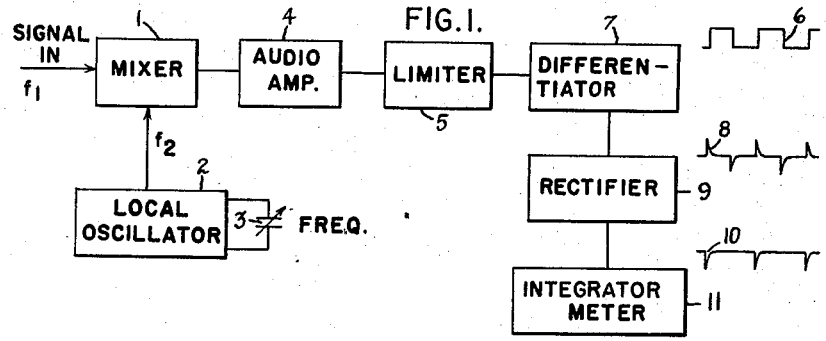
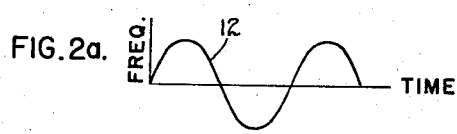
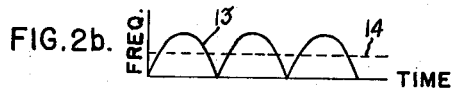
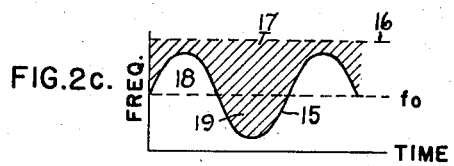
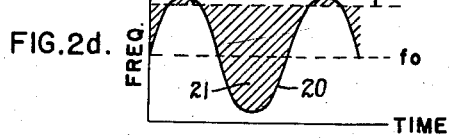
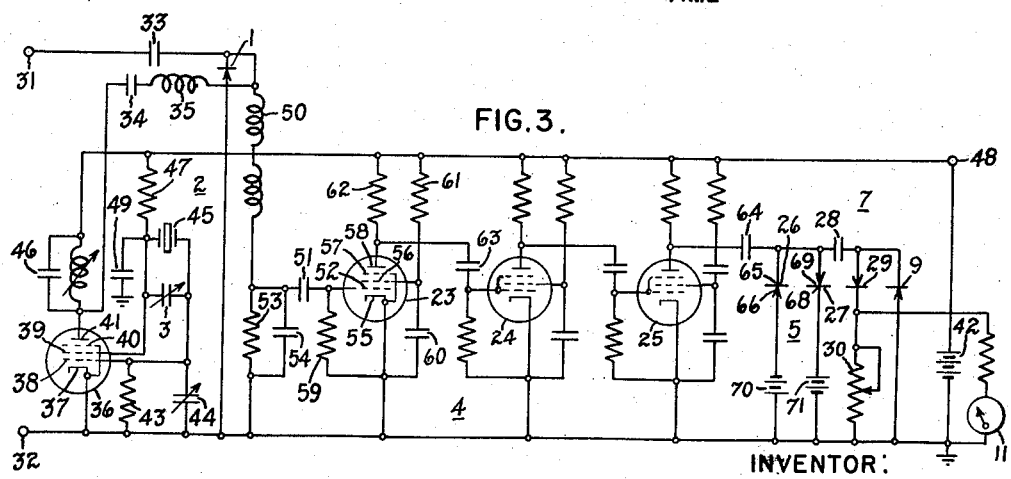
INVENTOR:
NEAL H. SHEPHERD,
BY *Julius J. Zaskalicky*
HIS ATTORNEY.

United States Patent Office 2,899,639
Patented Aug. 11, 1959

2,899,639

FREQUENCY DETECTION METHOD AND APPARATUS THEREFOR

Neal H. Shepherd, Syracuse, N.Y., assignor to General Electric Company, a corporation of New York Application September 24, 1954, Serial No. 458,092

4 Claims. (Cl. 324—79)

The present invention relates to frequency detection apparatus and method and has as a particular object thereof to provide improved method and apparatus for the detection of the peak variation in frequency of a wave having frequencies extending over a band of frequencies.

Heretofore, in general two types of frequency measuring apparatus have been used to measure the frequency variation of a wave. One type makes use of a frequency discriminator and is particularly useful in measuring the peak frequency variation of a wave. This type of device, while designed to detect and measure peak frequency variation, usually gives an indication which is a combination of the average and peak frequency variation. The discriminator type detectors are in general accurate at only one frequency of sine wave modulation. Another type of frequency measuring apparatus makes use of a pulse counting technique in which variations in frequency of the unknown wave are squared, differentiated and then integrated to obtain an indication of the average variation of frequency. This latter type of apparatus gives an indication of the average variation of frequency which can be used as a measure of the peak frequency deviation when the waveform of the wave whose frequency it is desired to measure is known. However, when the waveform is unknown, neither of these apparatus gives an accurate indication of the peak frequency deviation.

Accordingly, another object of the present invention is to provide a method for accurately determining the peak frequency deviation of a wave modulated by an unknown waveform.

A still other object of the present invention is to provide a method of utilizing a pulse counting type of frequency measuring apparatus for measuring the peak frequency deviation of a wave.

A further object of the present invention is to provide a method of setting the peak frequency deviation of a wave by means of a device which measures only the average frequency deviation of a wave.

In carrying out one aspect of the present invention as applied to apparatus for measuring the average frequency deviation of a wave having frequencies extending over a band of frequencies, means are provided for heterodyning the wave with a wave of controllably variable frequency and deriving the average of said heterodyned output. A slight variation in the frequency of said controllable frequency relative to the peak frequency of said wave causes a linear change or a nonlinear change in said average depending on whether said controllable frequency is outside or within said band of frequencies. Means are also provided for varying the frequency of said wave of controllably variable frequency until a point corresponding to the intersection of said linear change and said nonlinear change regions in said average is reached, the frequency at said point being equal to said peak frequency.

A second aspect of the invention is concerned with a method of setting the peak frequency deviation of a frequency modulated carrier wave employing apparatus including a local oscillator for indicating average frequency deviation. The method comprises the steps setting the local oscillator which differs from the carrier frequency by the peak deviation frequency so that the apparatus indicates an average frequency deviation of the frequency modulated carrier wave. The modulation deviation of the carrier wave is thereafter increased until an increase in the indicated average frequency deviation is obtained.

The features of this invention which are believed to be novel are set forth with particularity in the appended claims. The invention itself, however, both as to its organization and method of operation, together with further objects and advantages thereof, may best be understood by reference to the following description when taken in connection with the accompanying drawing wherein:

Fig. 1 shows a schematic diagram in block form of apparatus for measuring the average frequency of a wave;

Fig. 2A shows the variation in frequency of a carrier wave with time as that carrier wave is modulated in frequency by a sine wave;

Fig. 2B shows a graph useful in explaining the manner in which the apparatus of Fig. 1 derives the average frequency of a wave modulated in frequency in accordance with the graph of Fig. 2A;

Figs. 2C and 2D are graphs useful in explaining the manner in which the apparatus of Fig. 1 may be utilized to obtain the peak deviation of a carrier wave when modulated in frequency in accordance with the graph of Fig. 2A, and Fig. 3 is a schematic diagram of the apparatus shown in Fig. 1.

Referring now to Fig. 1, there is shown apparatus for measuring the average variation in frequency of a signal denoted $f_1$ of unknown frequency which it is desired to determine. The arrangement comprises a mixer device 1 to which is applied the signal $f_1$ and to which is also applied a signal of known frequency $f_2$ from oscillator 2. Frequency $f_2$ is controllably variable by means of the control element 3. The heterodyned output from the mixer 1 is applied to an audio amplifier 4, the output of which is limited in amplitude limiter 5 to obtain a wave 6. The wave 6 is differentiated by differentiator 7 to obtain a wave 8, the positive peaks of which are eliminated in the rectifier 9 thereby obtaining a wave 10. The pulses of the wave 10 are integrated in the meter 11 to obtain an indication of the average number thereof over a period of time. Thus, to obtain the average frequency deviation of a carrier wave of carrier frequency $f_0$ modulated in frequency by an audio wave, it would be necessary to adjust the frequency $f_2$ of the local oscillator to the carrier frequency $f_0$. The indication of meter 11 would then give a measure of the average frequency deviation of the carrier wave $f_0$. This will be clear by referring to Figs. 2A and 2B. Fig. 2A shows a graph 12 of frequency versus time of the carrier frequency of a wave modulated in frequency by an audio wave of identical waveform. Since a device of the kind shown in Fig. 1 does not detect the direction of departure of the carrier frequency but only its absolute value, the apparatus of Fig. 1 in effect then obtains an average value of the area included under the graph 13 of Fig. 2B. This average value is indicated by the ordinate 14.

Referring now to Fig. 2C there is shown in graph 15, the manner in which the frequency of a modulated carrier wave having a carrier frequency $f_0$ varies with modulation. Ordinate 16 represents the frequency to which the output of local oscillator 2 is adjusted. This latter frequency is offset from the carrier frequency $f_0$ by an amount greater than the peak deviation of the frequency of the modulated carrier wave from the carrier frequency $f_0$. The meter 11 in the apparatus of Fig. 1 will give an indication of the average frequency difference between frequency indicated by ordinate 16 and the frequency of the modulated carrier wave, i.e., will give an indication of the area 17 shown shaded between the graph 15 and the ordinate 16. It is pointed out that this indication will be constant as long as the peak deviation of the frequency of the modulated carrier wave from the carrier frequency $f_0$ is less than the difference between carrier frequency $f_0$ and frequency indicated by ordinate 16 since the positive and negative portions of the area included between the graph 15 and the $f_0$ axis are equal as is inherently the case in phase modulation and also in frequency modulation if the center frequency of the carrier remains fixed. It is further pointed out that this is true regardless of the waveform utilized to modulate the carrier wave having carrier frequency $f_0$. It is still further pointed out that were the freqeuncy represented by ordinate 16 less than the carrier frequency $f_0$, the above analysis would be equally applicable.

Referring now to Fig. 2D, in this figure is shown a graph similar to the graph shown in Fig. 2C except that the deviation in frequency of the modulated carrier wave having carrier frequency $f_0$ is caused to exceed the frequency represented by ordinate 16 of the local oscillator 2. The apparatus of Fig. 1 will produce an indication which is the average of the area indicated cross-hatched in this figure. It should be noted that a portion 22 of the positive peak of this frequency variation is integrated and also the entire negative portion 21 of the frequency variation, consequently, as the peak deviation increases, the indication obtained from the integrating meter will increase. It should also be noted that were the frequency indicated by ordinate 16 less than the carrier frequency $f_0$ by an equal amount, the same result would have been obtained.

Thus, as long as the frequency deviation of the carrier frequency $f_0$ is less than the difference between the frequency $f_2$ to which the local oscillator is offset, the indication obtained from the meter will remain constant. As soon as the frequency deviation exceeds this difference, the meter 11 will show an indication which increases with increase in peak deviation. Thus, this method may be used to set the peak deviation of a frequency modulated carrier wave to a predetermined peak deviation. Further, the peak deviation in frequency of a wave having a carrier frequency $f_0$ may be measured by the apparatus of Fig. 1 by applying signal to the mixer 1 where it is heterodyned with frequency $f_2$ of local oscillator 2. Frequency $f_2$ is adjusted to be equal to the carrier frequency $f_0$ and then it is varied in the direction of the peak deviation to the point where a linear rate of change of the indication of meter 11 is obtained. At this frequency the peak deviation is equal to the frequency of local oscillator 2 as explained in the above. The peak deviation of carrier frequency $f_0$ may also be determined by adjusting the frequency $f_2$, if this frequency is beyond the peak deviation frequency, until a nonlinear rate of change of the indication from the meter 11 is obtained. It is noted that if the frequency $f_2$ is beyond the peak deviation frequency and it is adjusted toward this latter frequency, the meter indication will show a linear rate of change until the point is reached where a nonlinear rate of change is obtained. At this latter point (i.e., the point at which the rate of change of the indication changes from linear to nonlinear) the frequency $f_2$ will be equal to the peak deviation frequency.

Referring now to Fig. 3, there is shown a schematic diagram of the circuit shown in block form Fig. 1. This figure shows a mixer 1, a local oscillator 2 with frequency control element 3, audio amplifier 4, including electron discharge devices 23, 24, and 25, a limiter 5, including unilaterally conducting devices 26 and 27, a differentiator 7, including coupling capacitor 28, unilaterally conducting device 29, and a resistance 30, a rectifier 9, and a current indicating meter 11.

The signal desired to be measured is applied between terminals 31 and 32, the latter of which is connected to ground. A mixer 1, which may be ordinary crystal type unilaterally conducting device is coupled to the input terminals 31 and 32 by means of coupling capacitor 33. The output of the local oscillator 2 is also coupled through coupling capacitor 34 and RF choke 35 to the mixer 1.

The local oscillator 2 comprises an electron discharge device 36 including a cathode 37, a grid 38, a screen grid 39, suppressor grid 40, and anode 41 connected as a Pierce type oscillator. The cathode 37 is connected to ground and to the negative terminal of source 42 of unilateral potential. The cathode 37 is also connected to the suppressor grid 40. The grid 38 is connected to ground through grid resistance 43 and also through a variable tuning capacitor 44 to ground. The grid 38 is also connected to one side of a piezoelectric element 45, the other side of which is connected screen grid 39. The screen grid 39 is also connected through load resistance 47 to the positive terminal 48 of source 42 and is also connected through bypass capacitor 49 to ground. The piezoelectric element 45 is shunted by tuning capacitor 3. The anode 41 is connected through a parallel tuned circuit 46 to the positive terminal of source 42. Since the oscillator 2 is a conventional oscillator well-known in the art and is used herein by way of example, a detailed description of its operation is not included.

The output from the anode 41 is coupled to the mixer 1 through coupling capacitor 34 and isolating choke 35. The mixer 1 has a non-linear characteristic, thus the wave appearing thereacross includes a wave having the difference of the frequencies applied to the input terminals 31 and 32 and the frequency of the local oscillator 2. This wave is coupled through isolating choke 50 and coupling capacitor 51 to the grid 52 of electron discharge device 23. Load resistance 53 is connected between choke 50 and ground. This resistance is bypassed by bypass capacitor 54 which functions to bypass the resistance 53 for frequencies above the heterodyned output frequency of the mixer 1.

Electron discharge devices 23, 24, and 25 are identical cascaded amplifiers. Electron discharge device 23 includes a cathode 55, a grid 52, a screen grid 56, a suppressor grid 57, and an anode 58. The cathode 55 is connected to ground and is also connected to suppressor grid 57. The grid 52 is connected through grid leak resistance 59 to ground. The screen grid is connected through filter capacitor 60 to ground and through load resistance 61 to positive terminal 48. Anode 58 is connected through load resistance 62 to positive terminal 48. The anode 58 is also connected through coupling capacitor 63 to the grid of electron discharge device 24. The anode of electron discharge device 25 is coupled through coupling capacitor 64 to the limiter 5.

The limiter 5 comprises unilaterally conducting device 26 having a cathode 65, an anode 66, and unilaterally conducting device 27 having a cathode 68 and an anode 69. Anode 66 is connected to the negative terminal of a source of unidirectional potential 70, the positive terminal of which is connected to ground. The cathode 65 is connected to one electrode of coupling capacitor 64, the other electrode of which is connected to the anode of electron discharge device 25. Anode 69 is also connected to this other electrode. The cathode 68 is connected to the positive terminal of a source 71 of unidirectional potential, the negative terminal of which is connected to ground. The voltage of the sources 70 and 71 are so arranged as to cut off the bottom and top portions respectively of the wave obtained from the electron discharge device 25. Connected in series between the capacitor 64 and ground is the differentiator 7 comprising a capacitance 28, a unilaterally conducting device 29 and a resistance 30. The unilaterally conducting device 29 is poled to conduct current to ground. The capacitance 28 and the resistance 30 of this differentiating network is proportioned to differentiate the wave obtained from the limiter 5 to produce a series of pulses. The rectifier 9 connected in shunt with the unilaterally conducting device 29 and resistance 30 is poled in the direction to short out the positive pulses appearing across these elements. Thus, only negative pulses are allowed to appear in the meter circuit 11 which is connected in shunt across the resistance 30.

While there has been shown and described a particular embodiment of the invention, it will be obvious to those skilled in the art that various changes and modifications may be made without departing from the invention in its broader aspects and it is, therefore, the aim in the appended claims to cover all such changes and modifications as fall within the true spirit and scope of the invention.

What I claim is new and desire to secure by Letters Patent of the United States is:

1. With apparatus for detecting the frequency of a wave whose frequency is unknown by averaging the cycles of said wave over a period of time, the method of setting to a desired frequency the peak variation in frequency of a first wave having frequencies extending over a band of frequencies comprising heterodyning said wave with a second wave having a frequency equal to the desired frequency, measuring the average frequency of said heterodyned wave, a slight variation in the frequency of said first wave relative to the frequency of said second wave causing a change or no change in said average frequency depending upon whether the desired frequency is outside or within the range of said band of frequencies, varying the frequency of said first wave until a point corresponding to the intersection of said change and said no change regions in said average frequency is reached, the desired frequency at said point being equal to the peak frequency of said first wave, thereby setting the peak variation of said first wave to the desired frequency.

2. With apparatus for measuring the average frequency of a wave by integrating the cycles thereof with respect to time and obtaining an indication of said integrated output, the method of measuring the peak variation in frequency of a carrier wave modulated in frequency by a wave of unknown waveform and frequency comprising heterodyning said modulated carrier wave with a wave of controllably variable frequency, measuring the average frequency of said heterodyned output, a slight variation in the frequency of said controllably variable frequency relative to the peak frequency of said carrier wave causing a linear change or a nonlinear change in said integrated output depending upon whether said controllable frequency is outside or within the range of variation of said carrier frequency, varying the frequency of said wave of controllably variable frequency until a point corresponding to the intersection of said linear change and said nonlinear change region in said integrated output is reached, the controllable frequency at said point being equal to said peak frequency, and measuring the frequency of said controllably variable frequency at said point, whereby the peak frequency of said modulated carrier wave is obtained.

3. The method of measuring the peak variation in frequency of a first wave having frequencies extending over a band of frequencies comprising heterodyning said wave with a wave of controllably variable frequency, measuring the average frequency of said heterodyned wave, a slight variation in the frequency of said controllable frequency relative to the peak variation in frequency of said first wave causing a linear change or a nonlinear change in said average frequency depending upon whether said controllable frequency is outside or within the range of said band of frequencies, varying the frequency of said wave of controllably variable frequency until a point corresponding to the intersection of said linear change and said nonlinear change regions in said average frequency is reached, the controllable frequency at said point being equal to the peak frequency of said first wave, and measuring the frequency of said controllably variable frequency at said point, whereby the peak frequency of said first wave is obtained.

4. A method of setting the peak frequency deviation of a frequency modulated carrier wave employing apparatus including a local oscillator for indicating average frequency deviation comprising the steps of setting the local oscillator to a frequency which differs from the carrier frequency by said peak frequency deviation whereby said apparatus indicates an average frequency deviation of said frequency modulated carrier wave and thereafter increasing the modulation deviation of said carrier wave until an increase in the indicated average frequency deviation is obtained.

References Cited in the file of this patent

UNITED STATES PATENTS

| 2,186,182 | Stocker | Jan. 9, 1940 |
| 2,438,801 | Braden | Mar. 30, 1948 |
| 2,539,673 | Peterson | Jan. 30, 1951 |

OTHER REFERENCES

Terman: "Electronic Measurements," second edition 1952, pp. 222–224.